United States Patent Office 3,262,710
Patented July 26, 1966

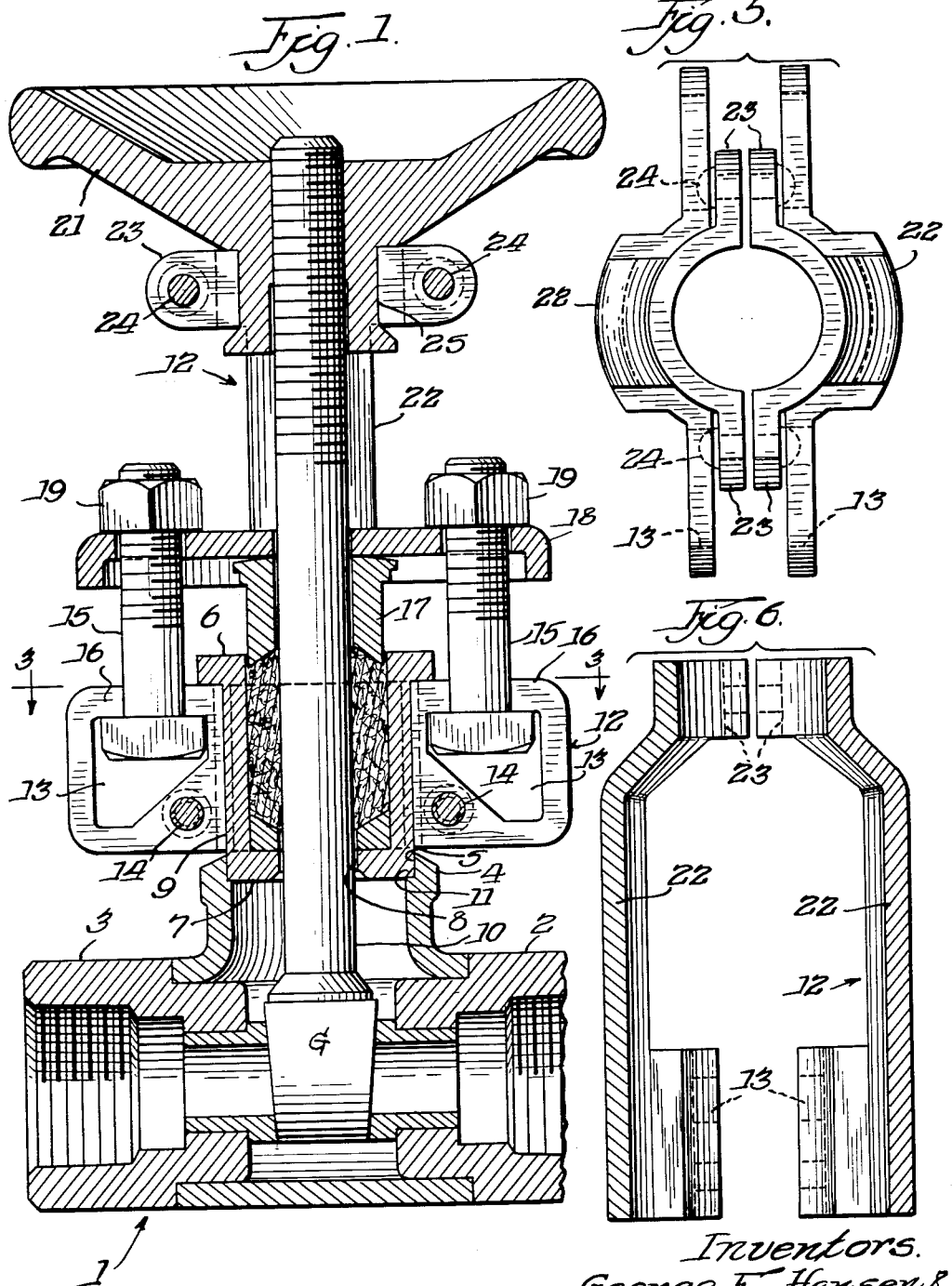

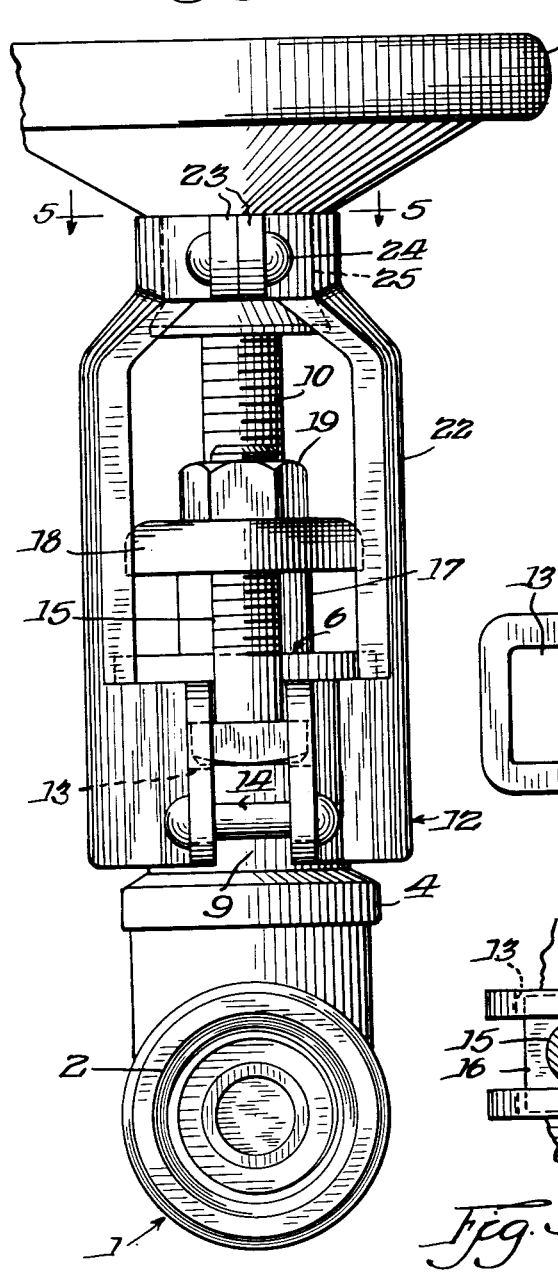

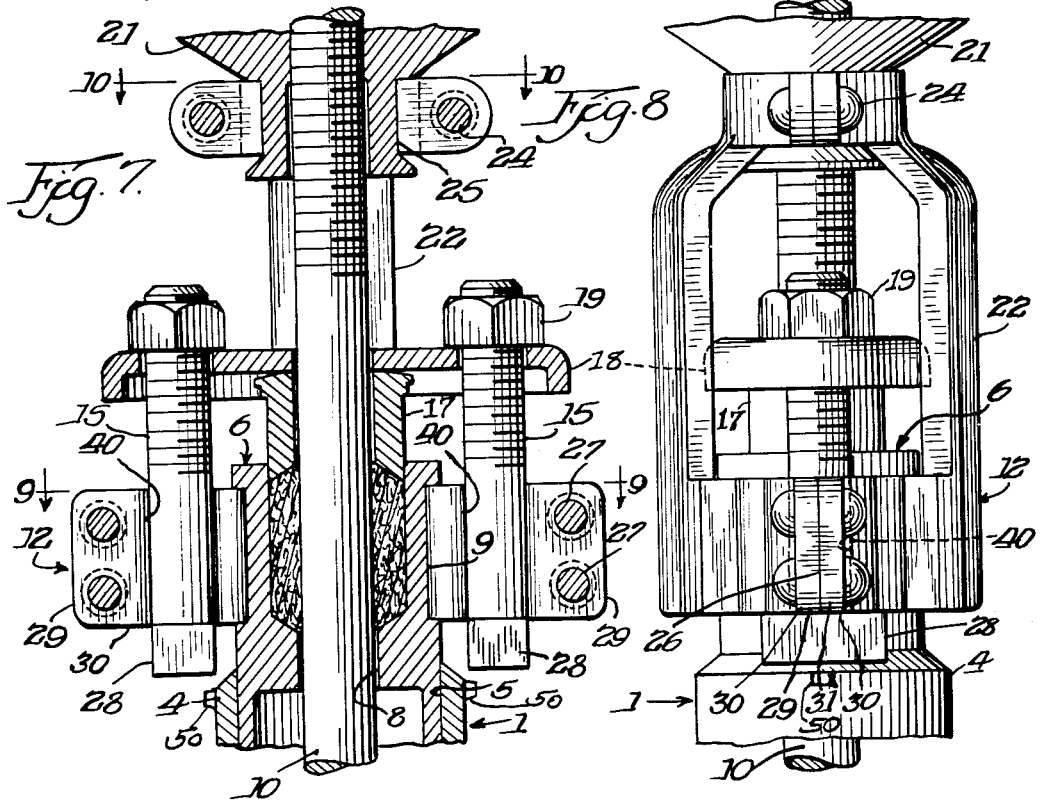
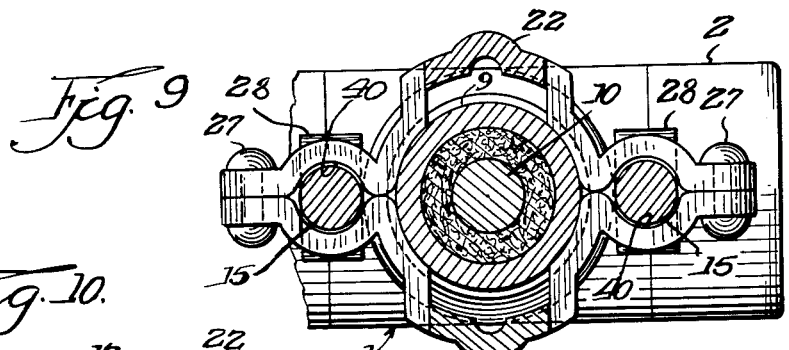
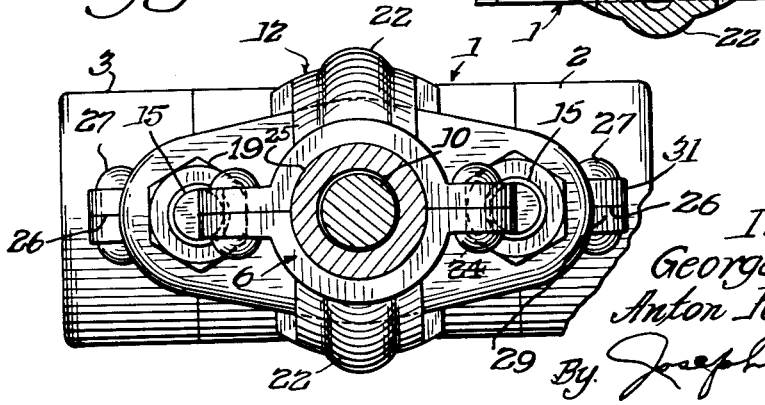

3,262,710
FABRICATED STUFFING BOX WITH GLAND
BOLT ARRANGEMENT
George E. Hansen, Elmwood Park, and Anton Korzenowski, Brookfield, Ill., assignors to Crane Co., Chicago, Ill., a corporation of Illinois
Filed July 26, 1963, Ser. No. 297,804
4 Claims. (Cl. 277—105)

This invention relates generally to a stuffing box mounting for valves and the like, and, more particularly, it is concerned with a novel arrangement thereof employing a gland T-bolt bracket construction for cooperation with the valve bonnet or centerpiece.

The invention is suitable not only for use on valves with which it is described in the instant specification, but it may also be used with other types of pressure vessels, for example, pumps, cylinders, and so forth, in which a reciprocating or a rotating or a combined reciprocating-rotating shaft is employed in a leakproof mounting, bearing or stuffing box.

At the outset, in order to have a better appreciation of the merits of this contribution, it should be obvious that when stuffing boxes are employed in connection with either rotating or reciprocating shafts, it is important to align the stuffing box with the shaft or stem.

Therefore, it is a prime object of this invention to provide a gland bolt bracket or support possessing such desirable flexibility to assure accurate alignment conveniently and thereby overcome or minimize this valve construction problem.

Another important object of this invention is to provide for a gland bolt bracket and mounting in which the valve yoke and the bonnet flange is assembled as a floating unit, thus eliminating any substantial misalignment of the valve stem and closure member in relation to the stuffing box.

More specifically, it is an important object of this invention to provide for a yoke-gland bolt bracket or holder in which a stamping may be employed and it is convenient to inspect the stuffing box packing or to remove the packing from the stuffing box provided by a predeterminately swingable gland bolt employing a standard or conventional square head.

Another important object is to provide for a specific form of mounting for gland T-bolts or square head bolts, preferably held in a member perhaps best described as a gland bolt retainer or bracket, the latter being preferably mounted on a peripheral portion of the stuffing box member, the latter functioning as a bonnet member or cover for the valve body or similar pressure vessel.

Another object is to provide for a gland bolt bracket and mounting for a stuffing box in which the yoke member therefor may be retained securely so as to permit attachment of a split portion thereof to a stuffing box or cover in effecting the actuation of the valve.

Another object is to provide for an improved gland bolt mounting for square head or T-bolts in which the retainer member therefor may be either bolted or riveted to the combined stuffing box and bonnet, while jointly serving as the mounting means for the gland square head or T-bolts either to contain or shield the latter members.

Other objects and advantages will become more readily apparent upon proceeding with the following description read in light of the accompanying drawings, in which:

FIG. 1 is a sectional assembly view of a valve embodying a preferred form of our invention;

FIG. 2 is an end exterior view taken at right angles to the construction shown in FIG. 1;

FIG. 3 is a fragmentary transverse sectional view taken on the line 3—3 of FIG. 1;

FIG. 4 is a view of the preferred form of the gland bolt retainer or bracket embodying our invention;

FIG. 5 is a transverse sectional view taken on the line 5—5 of FIG. 2 with clamping means separated;

FIG. 6 is a longitudinal sectional view taken on the line 6—6 of FIG. 4;

FIG. 7 is a fragmentary sectional view of a modified form of the gland-bolt bracket of our invention;

FIG. 8 is a fragmentary end exterior view taken at right angles to the construction shown in FIG. 7;

FIG. 9 is a fragmentary sectional view taken on the line 9—9 of FIG. 7; and

FIG. 10 is a fragmentary sectional view taken on the line 10—10 of FIG. 7.

Similar reference numerals refer to similar parts throughout the several views.

Referring now to FIG. 1, the valve body or casing generally designated 1 is similar to the fabricated gate valve shown in U.S. Patent No. 3,032,310, issued May 1, 1962. The casing 1 has the usual end connections 2 and 3 for attachment to a pipeline (not shown).

Insofar as the application of this invention is concerned, however, it should be appreciated that the matter of whether the valve body shown is either a gate, a globe, or whether it is fabricated or cast, or otherwise formed, such fabrication has no particular significance with respect to said application of the invention.

At the upper portion of the casing 1, the latter is annularly formed as at 4, and suitably recessed as at 5 to receive the stuffing box member generally designated 6, having the inturned annular shoulder portion 7. The latter portion is apertured as at 8 to receive the valve stem 10, which may be either reciprocally movable or rotatable or a combination of both and is attached in any suitable manner to a valve closure member G, as shown.

The outer peripheral portion of the stuffing box 6 is finished peripherally as at 9 to fit snugly within the body recessed portion 5. Here it may be brazed, soldered, welded, or otherwise suitably attached to the body, preferably being end supported upon the casing annular shoulder 11 as indicated. The peripheral portion 9 of the stuffing box is suitably encased within a split gland bolt retainer or bracket generally designated 12, the latter member being transversely apertured as at 13 in the two half portions of which it consists as shown more clearly in FIGS. 2 and 4. The described construction then receives and encloses the gland bolts 15 which extend through the apertured portion 16 upon drawing together the rivets 14 or bolts and assembling the respective halves of the gland bolt retainer 12 as shown. For purpose of compressing the usual packing, a gland 17 is preferably employed and mounted in the conventional manner to support a gland flange 18 against which the gland nuts 19 bear in their normal position to compress said packing.

In order to journal the stem 10 in connection with the actuating mechanism, such as the handwheel 21, the retainer 12 is provided with the oppositely disposed yoke arms 22 of bifurcated configuration, details of which are shown more clearly in FIGS. 4 to 6 inclusive. The gland bolt retaining member generally designated 12 thereby functions in the dual capacity as a yoke for the valve through said yoke arms 22. As previously referred to, the combined gland bolt retainer member 12 with its yoke arms 22 is attached at its lower portion to the peripheral portion 9 of the stuffing box 6 as shown. At their upper limits, the yoke arms 22 are bolted together by means of the respective transverse lug extensions 23 which are held in close abutting relation by means of either rivets 24 or substitute bolts so as to be clamped firmly around the shank portion 25 of the handwheel 21. It will be apparent that such arrangement allows for the journalling of the handwheel when the valve is being either opened or closed.

Thus the gland bolts are securely retained against loss between the respective apertured portions 16 and yet upon removal of nuts 19 are conveniently swung pivotally outward to permit repacking.

Referring to a further modified form as shown in FIGS. 7 to 10 inclusive, in this construction the stuffing box 6 is similarly received within a casing recess 5 for attachment thereto and either soldered, welded, or otherwise connected to the casing 1. However, in this construction, the gland bolts 15 are received within the combined yoke and gland bolt bracket or retainer 12 in a slightly different kind of mounting. The retainer member 12 instead of employing the split and spaced apart construction shown at the spaces 13 in FIGS. 1 to 4 inclusive are riveted or bolted together in close abutting relation as indicated more clearly at 26 in FIG. 8. This is preferably accomplished by means of a plurality of rivets or bolts 27. In this construction, it will be apparent that the head 28 of the gland bolts 15 bears against transverse undersurfaces 30 of the abutting lug extensions 29 and 31 as shown more clearly in FIG. 8.

Oppositely disposed lugs 50 on the casing portion 4 below bolt heads keep the gland bolts 15 from leaving the bore 40 and being lost. In all other respects the combined retainer and yoke function in the same manner as that construction previously described in connection with FIGS. 1 to 6 inclusive, therefore further description of the other parts is deemed to be unnecessary.

The advantage of the modified construction shown is that the bolt load of the gland bolts 15 is borne directly against the undersurfaces 30 of the bolt retainer extensions 29 and 31 rather than upon the upper transverse surfaces of the previous figures. The modified construction has the advantage of a more firmly fixed and long extending bearing at 40 as shown more clearly in FIG. 7 with relation to the retention of the gland bolts 15. At the same time, the casing lugs 50 will keep the heads 28 of the gland bolts 15 from moving past the body portion 4 and dropping out of the retainer 12. It will be apparent that all of the embodiments illustrated and described possess the advantage of permitting the gland bolts to be retained in such manner as to avoid loss or displacement from the combined retainer and yoke when the stuffing box is being packed.

In the construction shown in FIGS. 1 to 6 inclusive, the gland T-bolts 15 are not only securely retained but possess the additional flexibility in their use in that they are pivotally movable outwardly during the repacking operation whereby to provide more space for such operation.

In the modified construction shown in FIGS. 7 to 10 inclusive, the benefit lies in that the casing itself at 50 or by suitable enlargement of portion 4 prevents the loss by bodily displacement of the gland bolts 15 in addition to the extended journal mounting previously referred to.

In all cases, the yoke or retainer may be so economically fabricated as to be expandible.

It will be appreciated that while several forms of the invention have been illustrated and described, these examples are for purposes of illustration only and not of limitation. Therefore, the scope of the invention should be measured by the claims as appended hereto.

We claim:
1. In a valve construction or the like for supporting an actuating mechanism and providing a stuffing box therefor, the combination including a combined stuffing box member and bonnet, gland means for the actuating mechanism, gland bolts of T-head configuration for the stuffing box, split gland bolt retainer means for the said gland bolts, the said retainer means comprising a bracket consisting of a pair of apertured clamp member oppositely disposed in substantially abutting arrangement when assembled for engagement with an outer reduced peripheral portion of said stuffing box adjacent to the packing space in said stuffing box, means for drawing said clamp members together, each of the said clamp members having a yoke arm substantially axially therewith to form a yoke when assembled, extending around said stuffing box for journalling said actuating mechanism, said clamp members upon said assembly providing transverse aligned apertures for engagement of the T-heads of the gland bolts whereby to permit only limited axial movement of the gland bolts relative to the clamp members.

2. The subject matter of claim 1, the said apertured portions of said clamp members when assembled also forming apertured portions therein of substantially the same transverse configuration as the shank portions of the said gland bolts whereby to guide the latter members in said permitted axial movement.

3. In a valve construction or the like for supporting an actuating mechanism and providing a stuffing box therefor, the combination including a casing and a combined stuffing box member and bonnet, gland bolts of T-head configuration for the stuffing box, split gland bolt retainer means for the said gland bolts, the said retainer means comprising a bracket consisting of a pair of clamp members oppositely disposed in substantially abutting arrangement when assembled for engagement with an outer reduced peripheral portion of said stuffing box adjacent to the packing space in said stuffing box, means for drawing said clamp members together, each of the said clamp members having a yoke arm thereon to form a yoke when assembled extending around said stuffing box, gland means for the stuffing box between said yoke arms, and abutting gland bolt retainer extensions, said extensions of said clamp members upon said assembly providing bearing means on its lower transverse undersurfaces for the head of the gland bolt and long extending apertured bearing portions of substantially the same configuration as the shank portions of the said gland bolts for retaining the gland bolts permitting limited axial movement of the gland bolts relative to said casing and said retainer means.

4. The subject matter of claim 3, the said casing having lug means at an outer upper portion thereof limiting said axial movement of the gland bolts in a direction away from said retainer means to prevent said gland bolts from dropping out of place from the said clamp members.

References Cited by the Examiner

UNITED STATES PATENTS 2,563,012  8/1951  Dopp et al. _____ 277—105 X
3,162,455  12/1964  Englert et al. _____ 277—105

SAMUEL ROTHBERG, *Primary Examiner.*